United States Patent [19]
Chino

[11] Patent Number: 5,931,141
[45] Date of Patent: Aug. 3, 1999

[54] VAPOR TREATMENT SYSTEM FOR VOLATILE LIQUID

[75] Inventor: Yuji Chino, Saitama, Japan

[73] Assignee: Tennex Corporation, Tokyo, Japan

[21] Appl. No.: 09/166,525

[22] Filed: Oct. 6, 1998

[30] Foreign Application Priority Data

Oct. 6, 1997 [JP] Japan ..................................... 9-289092
Jul. 31, 1998 [JP] Japan .................................. 10-217671
Sep. 18, 1998 [JP] Japan .................................. 10-264696

[51] Int. Cl.[6] ........................... F02M 33/02; F02M 15/00
[52] U.S. Cl. ........................... 123/520; 123/541; 123/516
[58] Field of Search .................................... 123/541, 520, 123/521, 519, 518, 516, 198 D

[56] References Cited

U.S. PATENT DOCUMENTS

| | | | |
|---|---|---|---|
| 4,790,145 | 12/1988 | Thompson | 123/541 |
| 4,829,968 | 5/1989 | Onufer | 123/518 |
| 5,054,454 | 10/1991 | Hamburg | 123/520 |
| 5,275,145 | 1/1994 | Tuckey | 123/516 |
| 5,309,885 | 5/1994 | Rawlings | 123/541 |
| 5,431,144 | 7/1995 | Hyodo | 123/541 |
| 5,460,141 | 10/1995 | Denz | 123/520 |
| 5,533,486 | 7/1996 | Qutub | 123/541 |
| 5,584,279 | 12/1996 | Brunnhofer | 125/541 |
| 5,868,119 | 2/1999 | Endo | 123/520 |

*Primary Examiner*—Carl S. Miller
*Attorney, Agent, or Firm*—Foley & Lardner

[57] ABSTRACT

A vapor treatment system incorporated with an automotive fuel storage tank for a gasoline. The vapor treatment system comprises a vapor adsorbent canister containing therein vapor adsorbent. A first ventilation line is provided to have a first end section connected to an upper space inside the storage tank, and a second end section connected to the vapor adsorbent canister. A vapor control valve is disposed in the first ventilation line to control flow of vapor of the gasoline passing through the first ventilation line. A second ventilation line is provided to have a first end section connected to a liquid supply pipe through which the gasoline is supplied into the storage tank, and a second end section connected to the vapor adsorbent canister. A vapor-liquid contacting device is provided to include a container disposed inside the storage tank. A return line is provided such that the gasoline is returned from an engine through it into the storage tank. The return line has an end section located in the container of the vapor-liquid contacting device so as to fill the container with the returned gasoline. A purge line is provided to have a first end section located in the container and close to a bottom of the container of the vapor-liquid contacting device, and a second end section connected to the vapor adsorbent canister. Additionally, a vacuum pump is disposed in the purge line and operated to purge the vapor from the vapor adsorbent and feed the purged vapor into the container of the vapor-liquid contacting device so that the vapor is absorbed in the gasoline in the container of the vapor-liquid contacting device.

13 Claims, 6 Drawing Sheets

VAPOR TREATMENT SYSTEM FOR VOLATILE LIQUID

BACKGROUND OF THE INVENTION

1. Field of the Invention

This invention relates to improvements in a vapor treatment system incorporated with a storage tank for volatile liquid such as gasoline, kerosene benzene and alcohol, more particularly to a fuel vapor treatment system incorporated with a fuel storage tank containing fuel.

2. Description of the Prior Art

Most gasoline-fueled automotive vehicles have been equipped with an emission control or vapor treatment system to prevent gasoline vapor from being emitted to the atmospheric air from the viewpoint of environmental protection. Such gasoline vapor is mainly generated in a gasoline storage tank during stoppage or running of the vehicle. An example of such an emission control system is shown in FIG. 6 to be incorporated with the gasoline storage tank 1. The emission control system includes a carbon canister 2 which is connected through a first ventilation line R1 with an upper space inside the storage tank 1. The first ventilation line R1 is provided with a check valve 3 for the purpose of maintaining the pressure inside the storage tank 1 within a predetermined range. The check valve 3 is adapted to allow gasoline vapor to pass therethrough when a positive pressure is prevailing in the storage tank, while to allow air to pass therethrough when a negative pressure is prevailing in the storage tank. During stoppage or running of the vehicle, gasoline vapor generated inside the storage tank 1 is fed through the first ventilation line R1 into the carbon canister 2 filled with activated carbon, so that the gasoline vapor is adsorbed in the activated carbon. This is a so-called charge mechanism for gasoline vapor.

A fuel supply pipe 1a of the storage tank 1 is provided with a partition valve 4 which is adapted to be opened and closed upon insertion and extraction of a fuel supply nozzle N. When this partition valve 4 is opened, the inside of the fuel supply pipe 1a is connected through the partition valve 4 and a second ventilation line or pipe R2 to the first ventilation line R1 at a portion near the carbon canister 2, and additionally the inside of the storage tank 1 is connected through the second ventilation line R2 and the partition valve 4 to the first ventilation line R1. This allows gasoline vapor generated during fuel supply to be fed into the carbon canister 2. The second ventilation line R2 extending into the storage tank 1 is provided at its lower end with a float valve 5.

The carbon canister 2 is connected through a purge line or pipe R3 and through a vacuum introduction line R4 with an air intake pipe K of an engine E. Under the suction of intake vacuum during running of the engine E, air is sucked into the carbon canister 2 from an atmospheric air inlet 2a so as to purge gasoline vapor adsorbed in the activated carbon in the carbon canister 2. The purged gasoline vapor is sucked into the air intake pipe K. This is a so-called purge mechanism for gasoline vapor.

Now, regulation for exhaust gas emission control of automotive vehicles tends to be stricter from the viewpoint of environmental protection. Besides, combustion control in an engine of the automotive vehicle has been highly sophisticated for the purpose of improving fuel consumption and drivability (such as response and fidelity) of the engine. In view of these, the following difficulties have been encountered in the above-discussed conventional emission control system: Since gasoline vapor retained in the carbon canister is fed to the engine to be burned, air-fuel ratio of air-fuel mixture to be fed into the engine unavoidably gets out of order thereby making impossible to attain the above purpose. In contrast, if a control is made intending to suppress a change in air-fuel ratio, restoration of performance (or purge of gasoline vapor) is unavoidably retarded so that the carbon canister retains excess gasoline vapor which is to be discharged out of the carbon canister 2 from the atmospheric air inlet 2a of the carbon canister 2.

BRIEF SUMMARY OF THE INVENTION

It is an object of the present invention to provide an improved vapor treatment system incorporated with a storage tank, which can effectively overcome drawbacks encountered in conventional similar emission control or vapor treatment systems.

Another object of the present invention is to provide an improved vapor treatment system incorporated with a storage tank, which can cause volatile liquid vapor generated in the storage tank to be securely returned to the storage tank thereby preventing volatile liquid vapor from being emitted to atmospheric air, thus greatly contributing to environmental protection.

A further object of the present invention is to provide an improved vapor treatment system incorporated with a storage tank and an engine of an automotive vehicle, which can cause vapor of fuel (such as gasoline) generated in a gasoline storage tank to be securely returned to the storage tank thereby preventing gasoline vapor from being emitted to atmospheric air while never affecting combustion control in the engine.

A first aspect of the present invention resides in a vapor treatment system incorporated with a storage tank for a volatile liquid. The vapor treatment system comprises a vapor adsorbent canister containing therein vapor adsorbent. A first ventilation line is provided to have a first end section connected to an upper space inside the storage tank, and a second end section connected to the vapor adsorbent canister. A vapor control valve is disposed in the first ventilation line to control flow of vapor of the volatile liquid passing through the first ventilation line. A second ventilation line is provided to have a first end section connected to a liquid supply pipe through which the volatile liquid is supplied into the storage tank, and a second end section connected to the vapor adsorbent canister. A purge line is provided to have a first end section inserted into the storage tank, and a second end section connected to the vapor adsorbent canister. A device is provided for liquefying the vapor of the volatile liquid, the liquefying device being disposed in the purge. Additionally, a pump is disposed in the purge line upstream of the liquefying device with respect to flow of the vapor upon operation of the pump. The pump is operated to purge the vapor from the vapor adsorbent and to cause the purged vapor to pass through the liquefying device so that the purged vapor is liquefied.

A second aspect of the present invention resides in a vapor treatment system incorporated with a storage tank for a volatile liquid. The vapor treatment system comprises a vapor adsorbent canister containing therein vapor adsorbent. A first ventilation line is provided to have a first end section connected to an upper space inside the storage tank, and a second end section connected to the vapor adsorbent canister. A vapor control valve is disposed in the first ventilation line to control flow of vapor of the volatile liquid passing through the first ventilation line. A second ventilation line is provided to have a first end section connected to a liquid supply pipe through which the volatile liquid is supplied into the storage tank, and a second end section connected to the vapor adsorbent canister. A vapor-liquid contacting device is provided to include a container disposed inside the storage tank. A return line is provided such that the volatile liquid is returned through it into the storage tank. The return line has an end section located in the container of the vapor-liquid contacting device so as to fill the container with the returned volatile liquid. A purge line is provided to have a first end section located in the container and close to a bottom of the container of the vapor-liquid contacting device, and a second end section connected to the vapor adsorbent canister. Additionally, a pump is disposed in the purge line and operated to purge the vapor from the vapor adsorbent and feed the purged vapor into the container of the vapor-liquid contacting device so that the vapor is absorbed in the volatile liquid in the container of the vapor-liquid contacting device.

A third aspect of the present invention resides in a vapor treatment system incorporated with a storage tank for a volatile liquid. The vapor treatment system comprises a vapor adsorbent canister containing therein vapor adsorbent. A first ventilation line is provided to have a first end section connected to an upper space inside the storage tank, and a second end section connected to the vapor adsorbent canister. A vapor control valve is disposed in the first ventilation line to control flow of vapor of the volatile liquid passing through the first ventilation line. A second ventilation line is provided to have a first end section connected to a liquid supply pipe through which the volatile liquid is supplied into the storage tank, and a second end section connected to the vapor adsorbent canister. A vapor-liquid contacting device is disposed outside the storage tank and including a container which is closed to maintain liquid and gas tight seal. A return line is provided such that through the volatile liquid is returned through it into the storage tank. The return line has an end section located in the container of the vapor-liquid contacting device so as to fill the container with the returned volatile liquid. A purge line is provided to have a first end section located in the container and close to a bottom of the container of the vapor-liquid contacting device, and a second end section connected to the vapor adsorbent canister. Additionally, a pump is disposed in the purge line, the pump being operated to purge the vapor from the vapor adsorbent and feed the purged vapor into the container of the vapor-liquid contacting device so that the vapor is absorbed in the volatile liquid in the container of the vapor-liquid contacting device.

A fourth aspect of the present invention resides in a vapor treatment system incorporated with a storage tank for a volatile liquid. The vapor treatment system comprises a vapor adsorbent canister containing therein vapor adsorbent. A first ventilation line is provided to have a first end section connected to an upper space inside the storage tank, and a second end section connected to the vapor adsorbent canister. A vapor control valve is disposed in the first ventilation line to control flow of vapor of the volatile liquid passing through the first ventilation line. A second ventilation line is provided to have a first end section connected to a liquid supply pipe through which the volatile liquid is supplied into the storage tank, and a second end section connected to the vapor adsorbent canister. A purge line is provided to have a first end section inserted into the storage tank, and a second end section connected to the vapor adsorbent canister. A cooling device is provided for cooling and liquefying the vapor of the volatile liquid, the cooling device being disposed in the purge line. Additionally, a pump is disposed in the purge line upstream of the cooling device with respect to flow of the vapor upon operation of the pump. The pump is operated to purge the vapor from the vapor adsorbent and to cause the purged vapor to pass through the cooling device so that the purged vapor is cooled and liquefied to be returned to the storage tank.

A fifth aspect of the present invention resides in a gasoline vapor treatment system incorporated with a gasoline tank of an automotive vehicle. The vapor treatment system comprises a vapor adsorbent canister containing therein vapor adsorbent for gasoline vapor. A first ventilation line is provided to have a first end section connected to an upper space inside the storage tank, and a second end section connected to the vapor adsorbent canister. A vapor control valve is disposed in the first ventilation line to control flow of vapor of the gasoline passing through the first ventilation line. A second ventilation line is provided to have a first end section connected to a liquid supply pipe through which the gasoline is supplied into the storage tank, and a second end section connected to the vapor adsorbent canister. A purge line is provided to have a first end section inserted into the storage tank, and a second end section connected to the vapor adsorbent canister. A device is provided for liquefying the vapor of the gasoline, the liquefying device being disposed in the purge. A pump is disposed in the purge line upstream of the liquefying device with respect to flow of the vapor upon operation of the pump, the pump being operated to purge the vapor from the vapor adsorbent and to cause the purged vapor to pass through the liquefying device so that the purged vapor is liquefied.

With the thus arranged vapor treatment system according to the present invention, even if vapor of volatile liquid is generated in the storage tank, for example, owing to temperature rise inside the storage tank, the vapor is trapped in the vapor adsorbent canister and fed into the liquefying device under the action of the pump to be effectively liquefied. The thus liquefied vapor of the volatile liquid is securely returned into the storage tank, thereby preventing the vapor from being emitted to atmospheric air thus greatly contributing to environmental protection. In case that the vapor treatment system is applied to an automotive vehicle, vapor (such as gasoline vapor) is not fed to the engine thereby effectively preventing the air-fuel ratio of air-fuel mixture to be supplied to the engine from getting out of order, attaining highly sophisticated combustion control in the engine.

BRIEF DESCRIPTION OF THE DRAWINGS

In the drawings, like reference numerals and characters designate like parts and elements throughout all figures, in which.

DETAILED DESCRIPTION OF THE INVENTION

Figure 1:
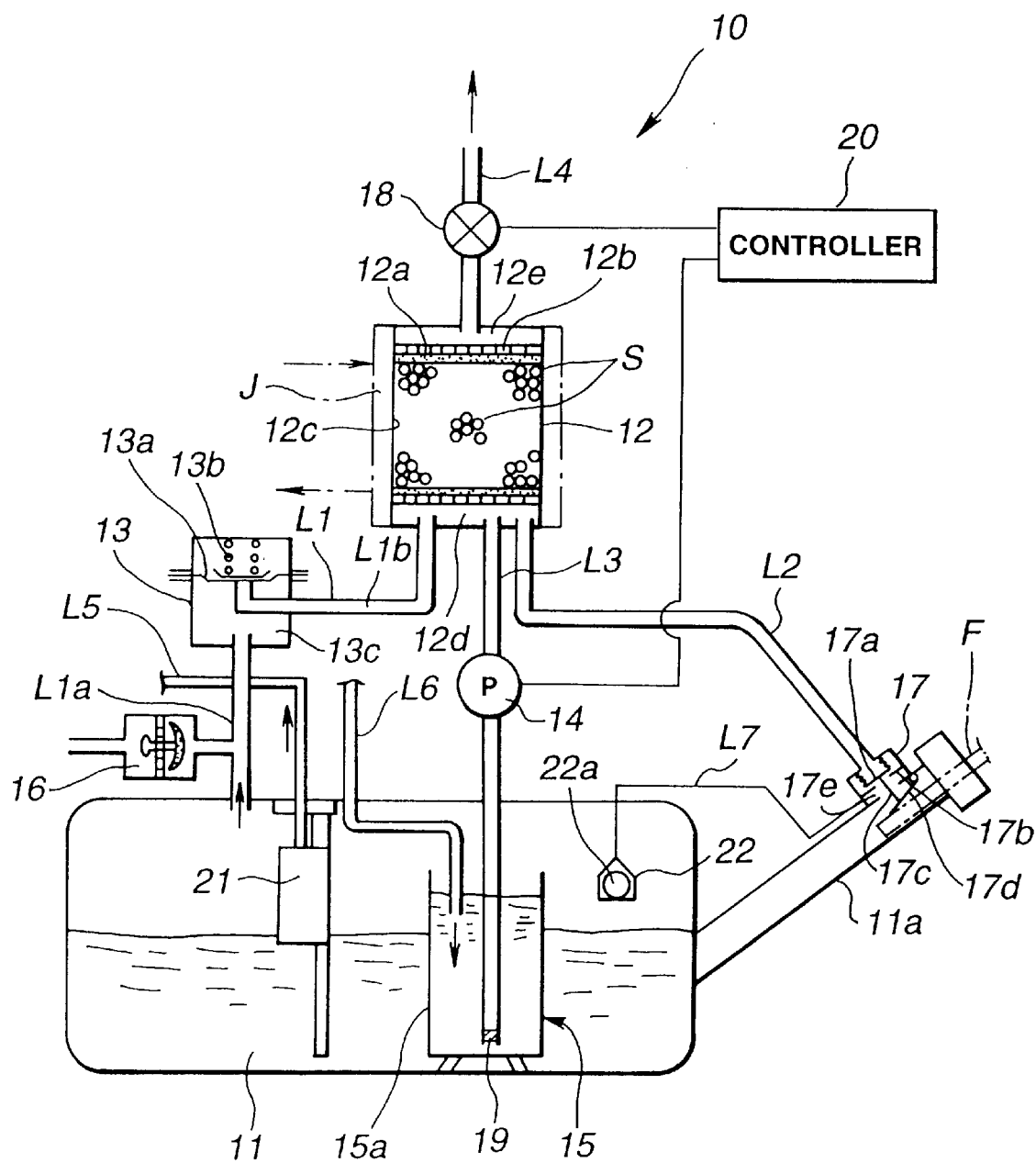
FIG. 1 is a schematic illustration of a first embodiment of the vapor treatment system according to the present invention.

Referring now to FIG. 1, a first embodiment of a vapor treatment system according to the present invention is illustrated by the reference numeral 10. The vapor treatment system 10 of this embodiment is incorporated with a gasoline storage tank 11 of an automotive vehicle. The storage tank 11 defines thereinside a space for storing gasoline, in which an upper part of the space is connected with a vapor control valve 13 through a lower part L1a of a first ventilation line or pipe L1. The vapor control valve 13 is connected with a lower end section of a vapor adsorbent canister 12 through an upper part L1b of the first ventilation line L1. The vapor control valve 13 is the spring-biased diaphragm type and includes a diaphragm member 13a which is biased by a spring 13b. The diaphragm member 13a is arranged to open or close a lower end of the upper part L1b of the first ventilation line L1 in accordance with a vapor pressure of gasoline within the storage tank 11. The diaphragm member 13a defines a vapor pressure chamber 13c which is connected with the inside of the storage tank 11 through the lower part L1a of the first ventilation line L1. The lower and upper parts L1a, L1b of the first ventilation line L1 are brought into communication with each other when the lower end of the upper part L1b is opened. A one-way check valve 16 is disposed in the lower part L1a of the first ventilation line L1 so as to function to prevent negative pressure from prevailing inside the storage tank 11.

The vapor adsorbent canister 12 includes two flat filter members 12a, 12a which are located parallel with and spaced from each other thereby defining an adsorbent chamber 12c which is filled with a certain amount of vapor adsorbent S. The vapor adsorbent S is an inorganic vapor adsorbent such as activated carbon or ceramic, or organic vapor adsorbent such as high polymer vapor adsorbent. The vapor adsorbent S is granular, massive or honeycomb-shaped. Additionally, two porous plates 12b, 12b are respectively disposed in contact respectively with the two flat filter members 12a, 12a in such a manner that each porous plate 12b is located on an opposite side of the filter member 12a with respect to the adsorbent chamber 12c. A lower flat chamber 12d is defined between the porous plate 12b and a bottom wall (not identified) of the vapor adsorbent canister 12. One end of the upper part L1b of the first ventilation line L1 is opened to the lower flat chamber 12d. An upper flat chamber 12e is defined between the porous plate 12b and an upper wall (not identified) of the vapor adsorbent canister 12.

A second ventilation line or pipe L2 is provided in such a manner that its upper end is opened to the lower flat chamber 12d of the vapor adsorbent canister 12. The second ventilation line L2 is connected through a vapor escape valve 17 with a fuel supply pipe 11a of the storage tank 11. Additionally, a purge line or pipe L3 is provided in such a manner that its upper end section is opened to the lower flat chamber 12d of the vapor adsorbent canister 12. The purge line L3 extends into the inside of the storage tank 11 and is provided therein a vacuum pump 14 which is electrically connected with a controller 20. It will be understood that the first ventilation line L1, the second ventilation line L2 and the purge line L3 are in communication with each other through the lower flat chamber 12d of the vapor adsorbent canister 12. A discharge line or pipe L4 through which air can be discharged is provided in such a manner that its lower end section is opened to the upper flat chamber 12e. An electromagnetic valve 18 is provided in the line L4 and electrically connected with the controller 20.

A vapor-liquid contacting device 15 is disposed inside the storage tank 11 and includes a cup-shaped cylinder or container 15a which vertically extends and is fixedly put on a bottom wall (not identified) of the storage tank 11. A lower end section of the purge line L3 is inserted into the cylinder 15a to be located close to a bottom wall (not identified) of the cylinder 15a. A porous vapor-dispersing member 19 such as mesh material or filter is installed in a lower end section of the purge line L3 so as to effectively accomplish contact of gasoline vapor and liquid gasoline inside the cylinder 15a and promote absorption of gasoline vapor into liquid gasoline.

A fuel pump 21 is disposed inside the storage tank 11 and connected through a fuel supply line or pipe L5 to an engine (not shown) so as to supply gasoline inside the storage tank 11 to the engine. The fuel pump 21 may be disposed outside the storage tank 11. Additionally, an excess fuel return line or pipe L6 is provided in such a manner that its lower end section is inserted into the cylinder 15a of the vapor-liquid contacting device 15. During operation of the engine, liquid gasoline is fed through the fuel supply line L5 to the engine while excess gasoline from the engine is returned through the excess fuel return line L6 into the cylinder 15a of the vapor-liquid contacting device 15. At this time, liquid gasoline within the cylinder 15a can be brought into sufficient contact with gasoline vapor ejected through the vapor-dispersion member 19, in which the returned gasoline from the fuel return line L6 can maintain such a gasoline level as to allow sufficient contact between gasoline vapor and liquid gasoline.

A vapor discharge valve 22 is disposed inside the storage tank 11 and located at the upper part of the space inside the storage tank 11. The vapor discharge valve 22 is of the float valve type and includes a float ball member 22a which can move upward to close a line or pipe L7 when the fuel level rises upon supply of fuel into the storage tank 11. Thus, the vapor discharge valve 22 functions to discharge excessive vapor generated inside the storage tank 11 when fuel supply into the storage tank 11 is made through the fuel supply pipe 11a.

The vapor escape valve 17 is disposed between a lower end section of the second ventilation line L2 and the fuel supply pipe 11a. The vapor escape valve 17 includes a movable valve member 17a which is biased by a spring (not identified) to be seatable on a valve seat 17b. When the valve member 17a is seated on the valve seat 17b, the vapor escape valve is brought into its closed state in which vapor of gasoline inside the fuel supply pipe 11a cannot be introduced through the second ventilation line L2 into the vapor adsorbent canister 12. The valve member 17a is provided with a rod member 17c which extends downward through a hole (not identified) formed in the valve seat 17b and a hole (not identified) formed in a wall of the fuel supply pipe 11a. The rod member 17c is moved upward to push the valve member 17a under the action of a pivotally movable plate 17d which is pushed upward upon insertion of a fuel supply nozzle F into the fuel supply pipe 11a as indicated in phantom in FIG. 1 when fuel supply is carried out. This brings the vapor escape valve 17 into its open state where gasoline vapor inside the fuel supply line 11a cannot be introduced through the second ventilation valve line L2 into the vapor adsorbent canister 12.

The upper end of the line L7 is connected to a lower chamber 17e of the vapor escape valve 17, the chamber 17e being defined between the valve seat 17b and the wall of the fuel supply pipe 11a, so that gasoline vapor introduced into the lower chamber 17e can be supplied to the vapor adsorbent canister 12 through a clearance between the valve member 17a and the valve seat 17b when the vapor escape valve 17 is in the open state.

With the above-arranged fuel vapor treatment system 10, when the pressure of gasoline vapor generated in the storage tank 11 reaches or exceeds a predetermined level upon rising of temperature around the storage tank 11 during stoppage or driving of the vehicle, gasoline vapor is introduced through the lower part L1a of the first ventilation line L1 into the vapor pressure chamber 13c of the vapor control valve 13 so as to upwardly move the valve member 13a thus bringing the vapor control valve 13 into its open state. At this time, gasoline vapor is introduced through the upper part L1b of the first ventilation line L1 into the vapor adsorbent canister 12 to be adsorbed in the vapor adsorbent S, in which gasoline vapor introduced in the lower flat chamber 12d enters the adsorbent chamber 12c through the porous plate 12b and the filter member 12a.

During fuel supply by the fuel supply nozzle F inserted into the fuel supply pipe 11a, a large amount of gasoline vapor is generated in the storage tank 11 and introduced into the second ventilation line L2 through a route including the vapor discharge valve 22, the line L7 and the vapor escape valve 17 and through another route including the fuel supply pipe 11a and the vapor escape valve 17. Gasoline vapor introduced in the second ventilation pipe line L2 is fed into the lower flat chamber 12d of the vapor adsorbent canister 12 and then enters the adsorbent chamber 12c through the porous plate 12b and the filter member 12a, so that gasoline vapor is adsorbed in the vapor adsorbent S. During stoppage of the vehicle or during fuel supply, the electromagnetic valve 18 is opened to discharge air supplied together with gasoline vapor into the vapor absorbent canister 12, through the discharge line L4 into the atmosphere.

When the engine is started to drive the vehicle, the controller 20 causes the electromagnetic valve 18 to be closed while the vacuum pump 14 is operated under the action of the controller 20. At this time, gasoline vapor adsorbed in the vapor adsorbent S is purged under the influence of vacuum applied to the vapor adsorbent canister 12 and then fed into the liquid-vapor contacting device 15 through the purge line L3. Gasoline vapor is ejected through the vapor-dispersion member 19 to form many small gasoline vapor foams, thereby accomplishing effective contact between gasoline vapor and liquid gasoline. This causes gasoline vapor to be effectively absorbed in liquid gasoline in the vapor-liquid contacting device 15.

During running of the engine, gasoline vapor having a vapor pressure over the predetermined level is directed through the first ventilation line L1 to the vapor adsorbent canister 12; however, an almost whole amount of the gasoline vapor is returned through the purge line L3 into the storage tank 11. It will be understood that gasoline vapor flowing through the first ventilation line L1 is fed through the lower flat chamber 12d of the vapor adsorbent canister 12 into the purge line L3.

When the pressure of gasoline vapor in the storage tank 11 lowers below the predetermined level, the diaphragm member 13a of the vapor control valve 13 closes the end of the upper part L1b of the first ventilation line L1. When a negative pressure or vacuum prevails inside the storage tank 11, the check valve 16 is opened to introduce atmospheric air into the storage tank 11, thus preventing the storage tank 11 from being damaged.

The vapor adsorbent canister 12 may be provided with a water jacket or heating device J which is formed around the adsorbent chamber 12c as indicated in phantom in FIG. 1. The water jacket J is supplied with high temperature engine coolant (about 80° C.) from a radiator (not shown) of the engine. This promotes purge of gasoline vapor adsorbed in the vapor adsorbent S during purge of gasoline vapor from the vapor adsorbent canister 12. The water jacket J may be replaced with an electric heater surrounding the adsorbent chamber 12c, in which the adsorbent chamber 12c is heated during purge of gasoline vapor under action of the controller 20.

Figure 2:
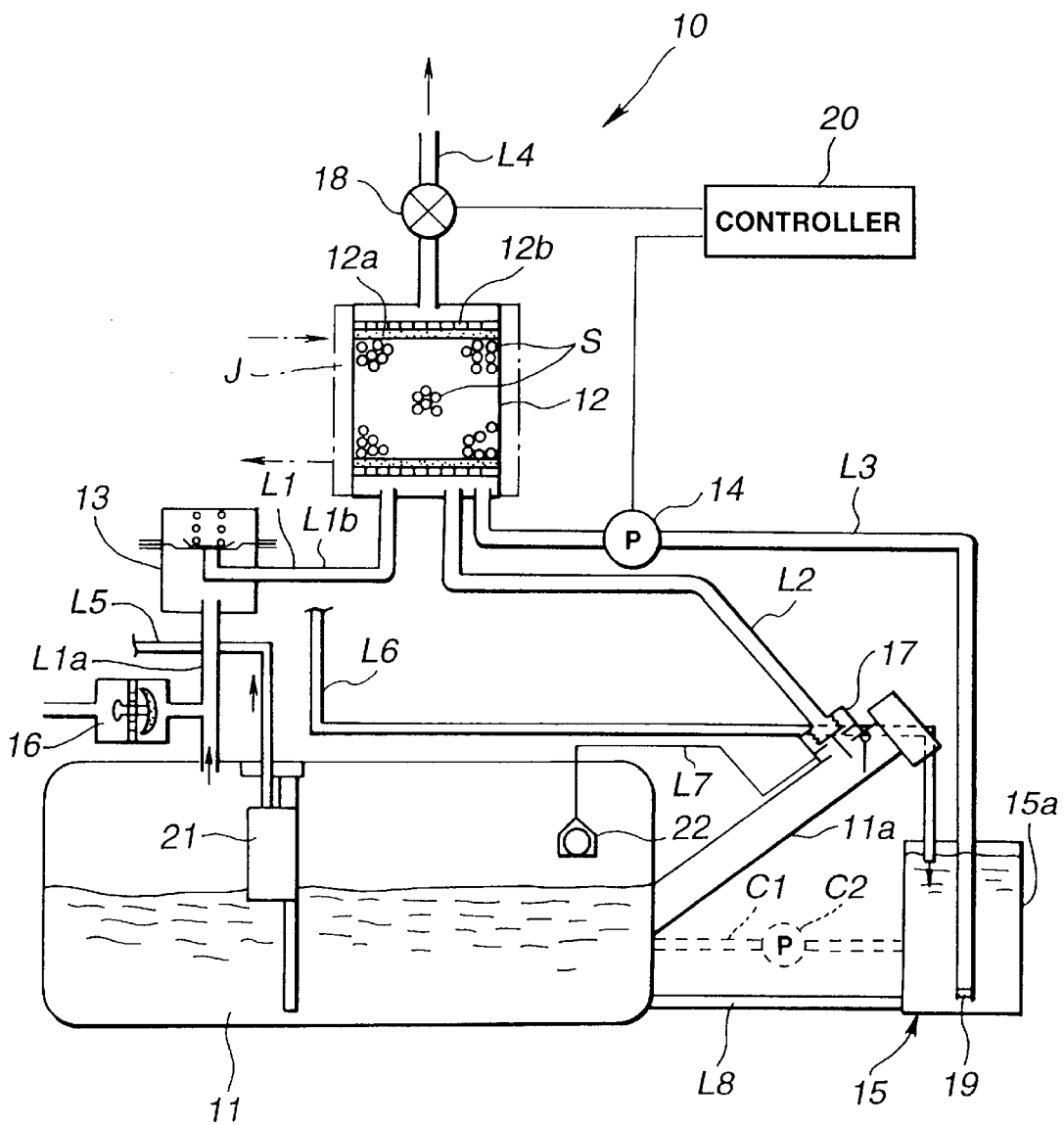
FIG. 2 is a schematic illustration of a second embodiment of the vapor treatment system according to the present invention.

FIG. 2 illustrates a second embodiment of the fuel vapor treatment system 10 according to the present invention, which is similar to the first embodiment with the exception that the vapor-liquid contacting device 15 is located outside the gasoline storage tank 11. In this embodiment, the cylinder or container 15a is closed at its top so as to prevent gasoline vapor and liquid gasoline from leaking out of the cylinder 15a. A communication line or pipe L8 is provided to connect the bottom section of the inside of the cylinder 15a with the bottom section of the inside of the storage tank 11. It will be understood that the purge line L3 and the excess fuel return line L6 are the same in connecting condition and function as those in the first embodiment.

According to this embodiment, the vapor-liquid contacting device 15 is located separate from the storage tank 11, and therefore it is facilitated to prepare the gasoline storage tank with or without the fuel vapor treatment system 10 in accordance with market places for the vehicle. Besides, the fuel vapor treatment system 10 can be installed regardless of difference in vehicle kind, thereby increasing applicability of the fuel vapor treatment system 10. In this embodiment, while liquid gasoline can be circulated through the storage tank 11 and the vapor-liquid contacting device 15 under the fuel pump 21, a communication line or pipe C1 having a pump C2 for circulating liquid gasoline may be provided between the inside of the storage tank 11 and the inside of the cylinder 15a of the vapor-liquid contacting device 15 as indicated in phantom in FIG. 2 in addition to the communication line L8 so as to further ensure the circulation of liquid gasoline between the storage tank 11 and the vapor-liquid contacting device 15.

Figure 3:
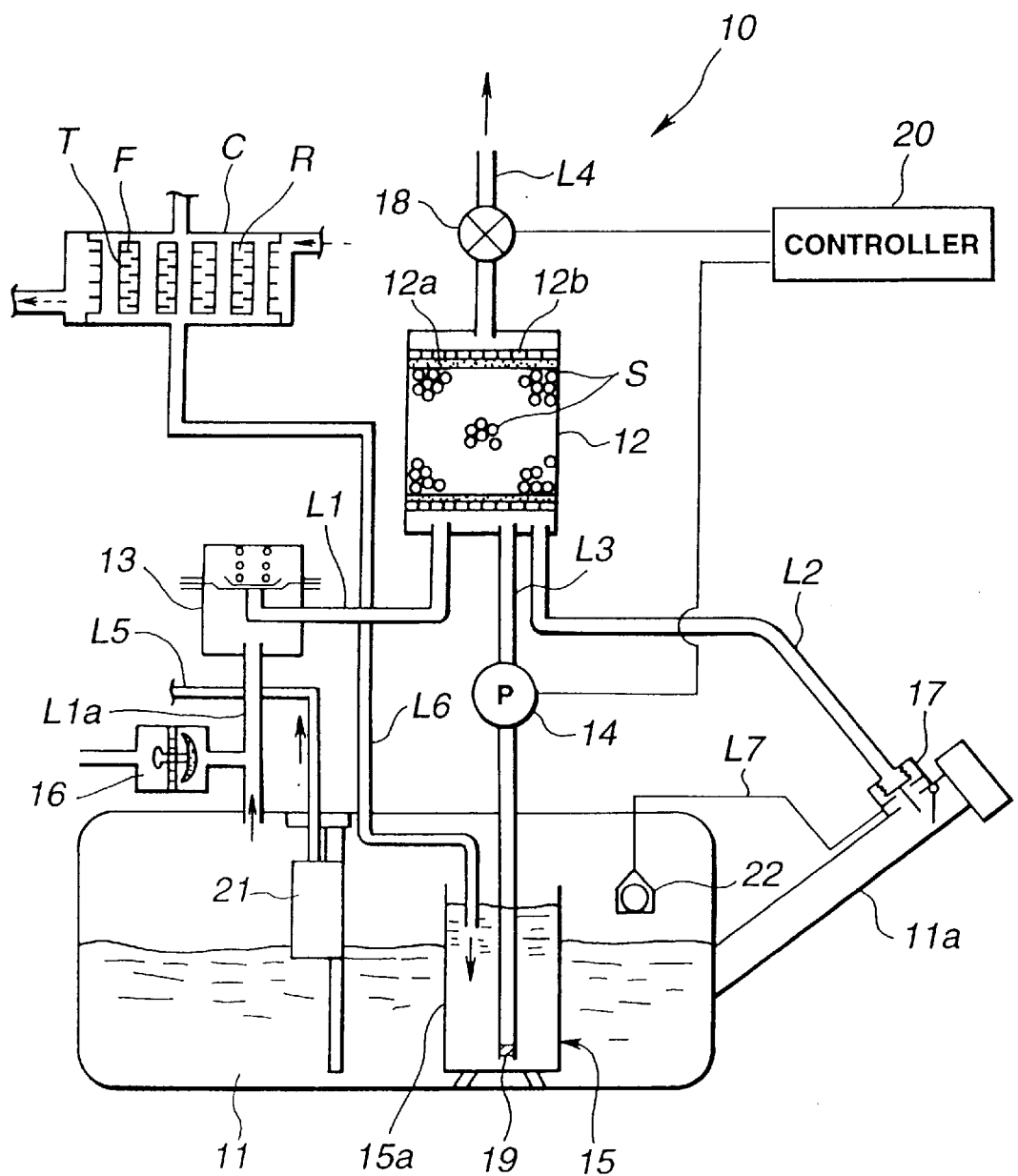
FIG. 3 is a schematic illustration of a third embodiment of the vapor treatment system according to the present invention.

FIG. 3 illustrates a third embodiment of the fuel vapor treatment system 10 according to the present invention, which is similar to the first embodiment with the exception that a cooling device C is disposed in the excess fuel return line L6. The cooling device C in this embodiment is a multitubular heat exchanger in which excess fuel returned from the engine flows through the inside of each tube T while refrigerant of an air conditioner (not shown) flows through a refrigerant flow passage R formed outside tubes T. Each tube T is provided at its outside surface with fins F. By virtue of the cooling device C, excess fuel returned from the engine is cooled and fed to the vapor-liquid contacting device 15.

In this embodiment, the temperature of liquid gasoline inside the vapor-liquid contacting device 15 is lowered thereby promoting liquefaction and improving an absorption efficiency (a percentage of gasoline vapor absorbed in liquid gasoline in the vapor-liquid contacting device 15) which is, for example, 92% at 40° C. and 98% at 25° C. Additionally, liquid gasoline which is cooled by the cooling device C and returned into the storage tank 11 causes whole liquid gasoline within the storage tank 11 to be lowered in temperature thereby reducing an amount of gasoline vapor generated inside the storage tank 11. It will be understood that the heat exchanger as the cooling device C may be replaced with a so-called Electronic Peltier Module (thermoelectric cooling module).

Figure 4:
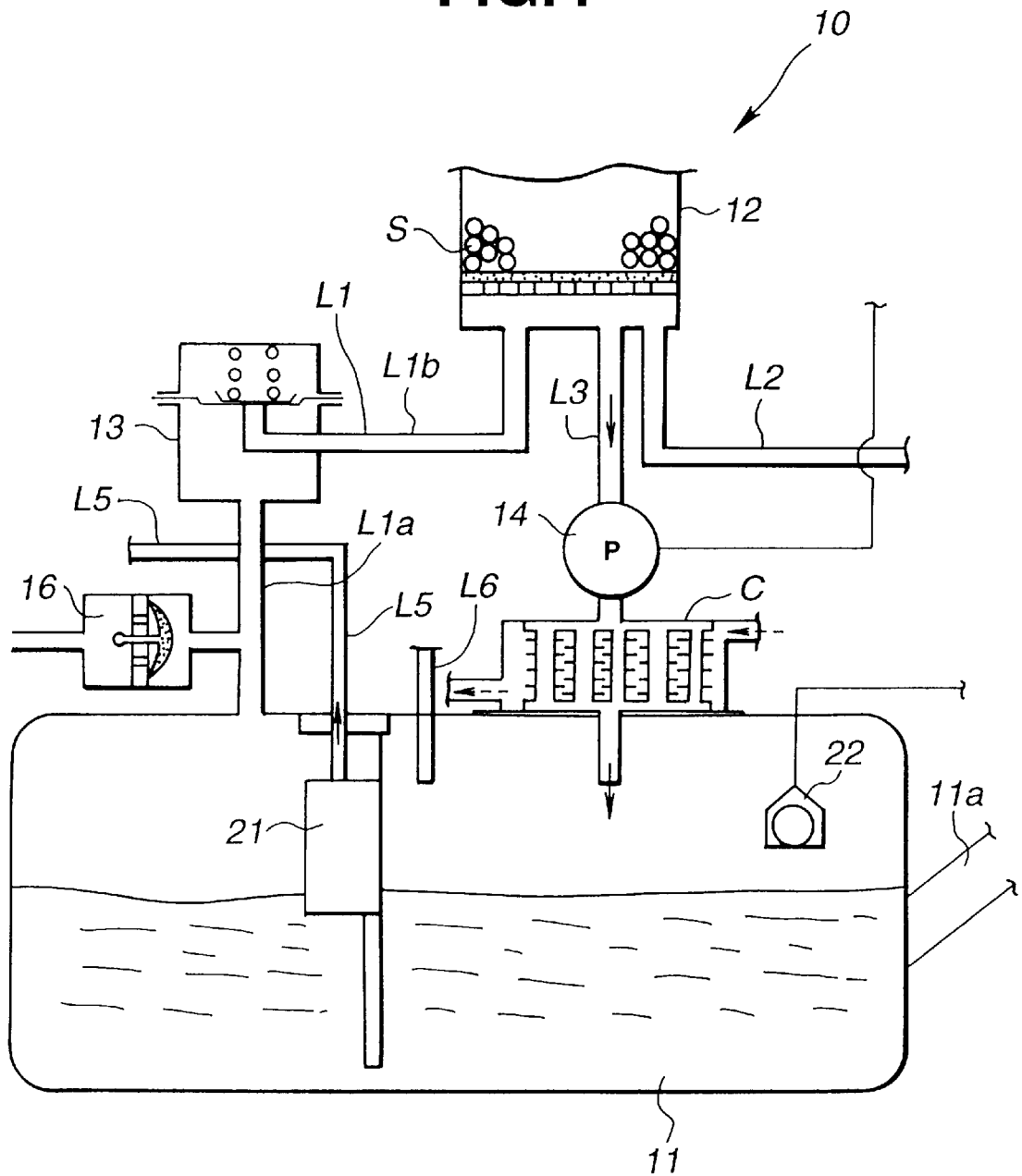
FIG. 4 is a schematic illustration of a fourth embodiment of the vapor treatment system according to the present invention.

FIG. 4 illustrates a fourth embodiment of the fuel vapor treatment system 10 according to the present invention, which is similar to the third embodiment with the exception that the cooling device (heat exchanger) C is used in place of the vapor-liquid contacting device 15 and disposed in the purge line L3. In this embodiment, the vapor-liquid contacting device 15 is omitted. The cooling device C is located outside the storage tank 11 in such a manner that gasoline vapor fed from the vacuum pump 14 is cooled and then returned into the storage tank 11. It will be understood that this embodiment allows the vapor-liquid contacting device 15 to be omitted.

Figure 5:
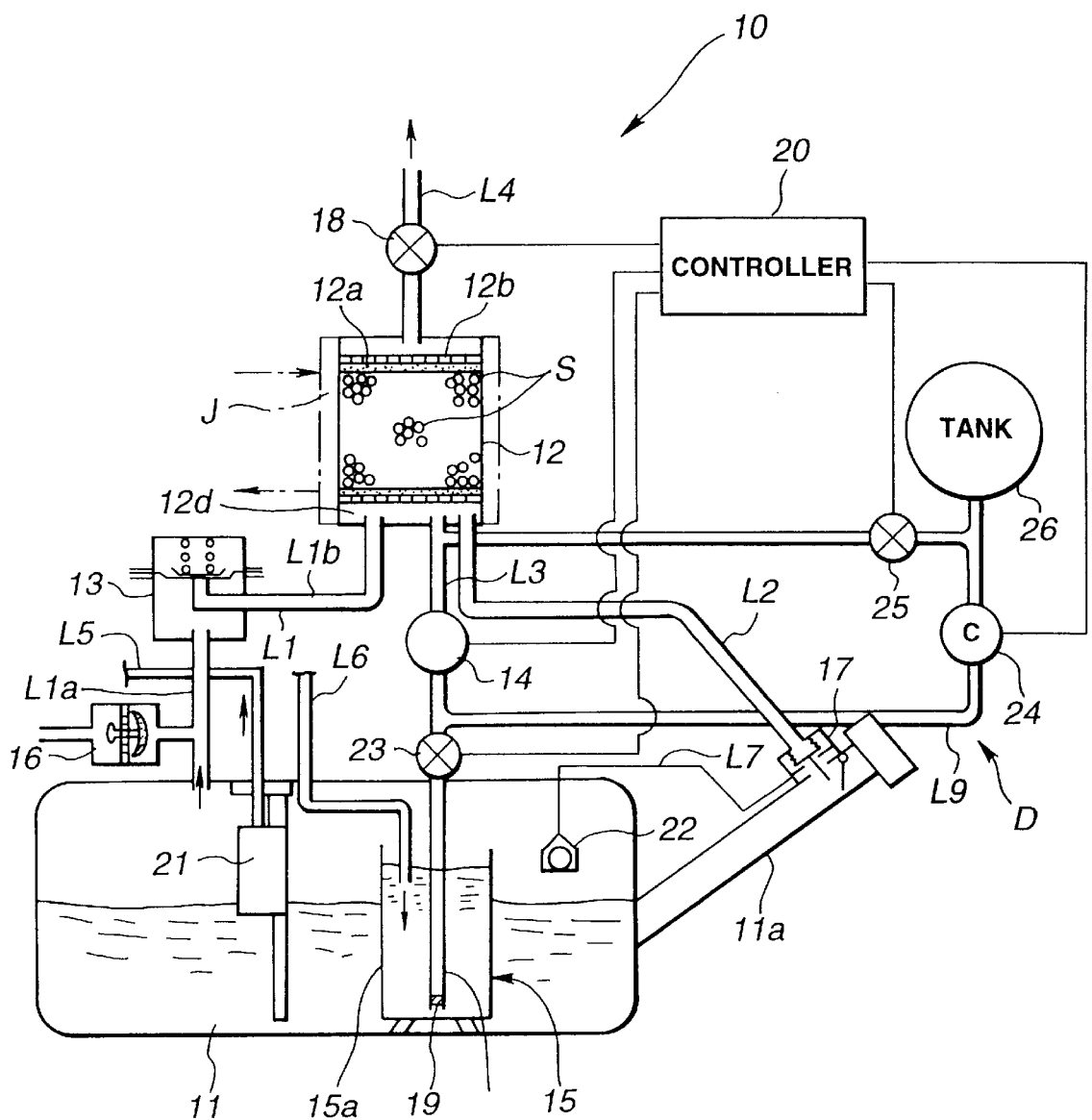
FIG. 5 is a schematic illustration of a fifth embodiment of the vapor treatment system according to the present invention.
Figure 6:
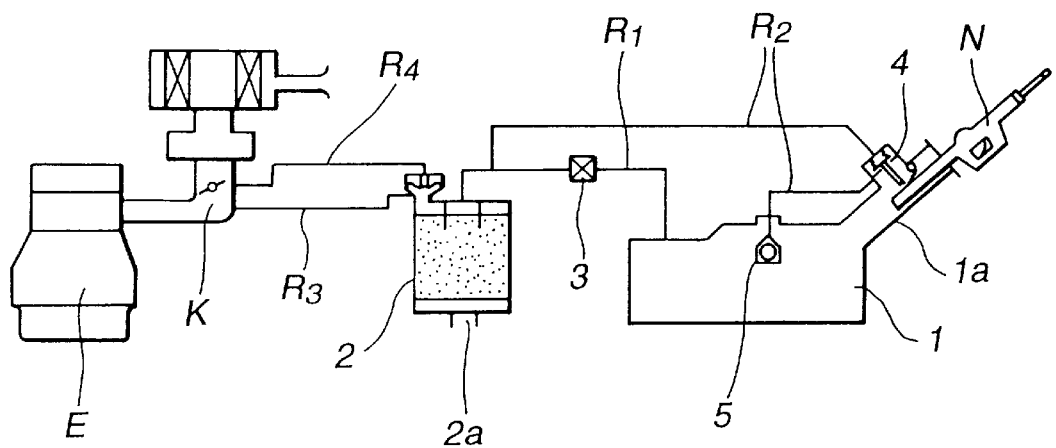
FIG. 6 is a schematic illustration of a conventional emission control or vapor treatment system.

FIG. 5 illustrates a fifth embodiment of the fuel vapor treatment system according to the present invention, which is similar to the first embodiment except for providing a device D for preventing the pressure within the storage tank 11 from rising owing to the fact that gas (air, or air containing a low concentration of fuel vapor) staying in the fuel vapor treatment system 10 is fed to the storage tank 11 at engine starting. In this embodiment, a sub-line L9 is provided in such a manner as to connect a portion upstream of the vacuum pump 14 and a portion downstream of the vacuum pump 14 in the purge line L3 in a direction in which purged vapor flows under the action of the vacuum pump 14. In other words, the sub-line L9 has an upper end section connected to the upstream portion of the purge line L3, and a lower end section connected to the downstream portion of the purge line L3. A first valve 23 is disposed in the purge line L3 at a portion downstream of the above-mentioned downstream portion. A compressor 24 and a second valve 25 are disposed in series with each other in the sub-line L9. Additionally, a sub-tank 26 is provided to be connected to the sub-line L9 at a portion between the compressor 24 and the second valve 25. The first valve 23, the second valve 25 and the compressor 24 are electrically connected to the controller 20 so as to be systematically controlled together with the vacuum pump 14 and the electromagnetic valve 18 under the action of the controller 20.

With the above arrangement of the fifth embodiment, when engine is started or when gasoline vapor is purged from the vapor absorbent S in the vapor absorbent canister 12, the compressor 24 is started to be operated together with starting of operation of the vacuum pump 14 under a condition where both the first and second valves 23, 25 are closed. Gas staying in the system 10 is temporarily stored in the sub-tank 26, and then operation of the compressor 24 is stopped. Subsequently, the first valve 23 is opened so that gasoline vapor adsorbed in the vapor adsorbent S is fed into the vapor-liquid contacting device 15 under the action of the vacuum pump and absorbed in liquid gasoline, thereby accomplishing restoration of performance of the vapor adsorbent S. Restoration of performance of the vapor adsorbent S depends on vacuum and temperature applied to the vapor adsorbent S. In this case, operation of the vacuum pump 14 is stopped when performance of the vapor adsorbent S is restored to a level at which gasoline vapor cannot overflow when gasoline vapor is adsorbed. At this time, the first valve 23 is closed while both the second valve 25 and the electromagnetic valve 18 are opened, so that gas stored in the sub-tank 26 is passed through the layer of the vapor adsorbent S and is discharged to the atmospheric air from the line L4 from the discharge line L4. At this time, gasoline vapor contained in the gas stored in the sub-tank 26 is adsorbed in the vapor adsorbent S. An operation for temporarily storing gas staying in the system 10 within the sub-tank 14 is carried out whenever purging of gasoline vapor from the vapor adsorbent S is started.

While the sub-line L9 has been shown and described such that its upper and lower end sections are branched off from the purge line L3 in the fifth embodiment, it will be understood that the upper end sections may be connected to the vapor adsorbent canister 12 (for example, the lower flat chamber 12d to which the purge line L3 is connected), so that it is sufficient that the upper and lower end sections of the sub-line L9 are respectively connected to the upstream and downstream sides of the vacuum pump 14 with respect to flow of vapor upon operation of the vacuum pump 14.

Although a peculiar configuration (including the integers L9, 23, 24, 25, 26) for the fifth embodiment has been shown and described as being applied to the arrangement in which the vapor-liquid contacting device 15 is disposed inside the storage tank 11, it will be appreciated that the peculiar configuration may be applied to the arrangement of FIG. 2 in which the vapor-liquid contacting device 15 is disposed outside the storage tank, or the arrangement of FIG. 3 in which the vapor-liquid contacting device 15 is provided while the cooling device C is disposed in the excess fuel return line L6 to cool excess fuel returned from the engine, or the arrangement of FIG. 4 in which the cooling device C is disposed downstream of the vacuum pump 14 without providing the vapor-liquid contacting device.

While all the embodiments have been shown and described such that the principle of the present invention has been applied to the vapor treatment system incorporated with the automotive vehicle gasoline storage tank, it will be appreciated that the principle of the present invention may be applied to vapor treatment systems incorporated with depots and storage facilities (such as gasoline station) for treating fuels and other volatile chemicals or organic solvents such as benzene and alcohol, in which operation of the vacuum pump 14 and the electromagnetic valve 18 are controlled under the action of changeover devices such as timers which are connected to the controller 20.

What is claimed is:

1. A vapor treatment system incorporated with a storage tank for a volatile liquid, comprising:

a vapor adsorbent canister containing therein vapor adsorbent;

a first ventilation line having a first end section connected to an upper space inside the storage tank, and a second end section connected to said vapor adsorbent canister;

a vapor control valve disposed in said first ventilation line to control flow of vapor of the volatile liquid passing through said first ventilation line;

a second ventilation line having a first end section connected to a liquid supply pipe through which the volatile liquid is supplied into the storage tank, and a second end section connected to said vapor adsorbent canister;

a purge line having a first end section inserted into the storage tank, and a second end section connected to said vapor adsorbent canister;

a device for liquefying the vapor of the volatile liquid, said liquefying device being disposed in said purge; and a pump disposed in said purge line upstream of said liquefying device with respect to flow of the vapor upon operation of said pump, said pump being operated to purge the vapor from said vapor adsorbent and to cause the purged vapor to pass through said liquefying device so that the purged vapor is liquefied.

2. A vapor treatment system incorporated with a storage tank for a volatile liquid, comprising:

a vapor adsorbent canister containing therein vapor adsorbent;

a first ventilation line having a first end section connected to an upper space inside the storage tank, and a second end section connected to said vapor adsorbent canister;

a vapor control valve disposed in said first ventilation line to control flow of vapor of the volatile liquid passing through said first ventilation line;

a second ventilation line having a first end section connected to a liquid supply pipe through which the volatile liquid is supplied into the storage tank, and a second end section connected to said vapor adsorbent canister;

a vapor-liquid contacting device including a container disposed inside the storage tank;

a return line through which the volatile liquid is returned into the storage tank, said return line having an end section located in said container of said vapor-liquid contacting device so as to fill said container with the returned volatile liquid;

a purge line having a first end section located in said container and close to a bottom of said container of said vapor-liquid contacting device, and a second end section connected to said vapor adsorbent canister; and a pump disposed in said purge line, said pump being operated to purge the vapor from said vapor adsorbent and feed the purged vapor into said container of said vapor-liquid contacting device so that the vapor is absorbed in the volatile liquid in said container of said vapor-liquid contacting device.

3. A vapor treatment system as claimed in claim 2, further comprising:

a sub-line having first and second end sections which are connected respectively to upstream and downstream portions of said purge line, said upstream and downstream portions being located respectively on upstream and downstream sides of said pump with respect to flow of the vapor of the volatile liquid upon operation of said pump;

a first valve disposed in said purge line and located downstream of said downstream portion in said purge line with respect to flow of the vapor of the volatile liquid upon operation of said pump;

a second valve disposed in said sub-line;

a compressor disposed in said sub-line and located in series with said second valve; and a sub-tank connected to a portion of said sub-line between said second valve and said compressor so as to temporarily store gas staying in said vapor treatment system.

4. A vapor treatment system as claimed in claim 2, further comprising a cooling device disposed in said return line to cool the volatile liquid passing through the return line to be fed into said container of said vapor-liquid contacting device.

5. A vapor treatment system as claimed in claim 2, further comprising a heating device disposed around said vapor adsorbent canister to heat said vapor adsorbent when the vapor is purged from said vapor adsorbent.

6. A vapor treatment system incorporated with a storage tank for a volatile liquid, comprising:

a vapor adsorbent canister containing therein vapor adsorbent;

a first ventilation line having a first end section connected to an upper space inside the storage tank, and a second end section connected to said vapor adsorbent canister;

a vapor control valve disposed in said first ventilation line to control flow of vapor of the volatile liquid passing through said first ventilation line;

a second ventilation line having a first end section connected to a liquid supply pipe through which the volatile liquid is supplied into the storage tank, and a second end section connected to said vapor adsorbent canister;

a vapor-liquid contacting device disposed outside the storage tank and including a container which is closed to maintain liquid and gas tight seal;

a return line through which the volatile liquid is returned into the storage tank, said return line having an end section located in said container of said vapor-liquid contacting device so as to fill said container with the returned volatile liquid;

a purge line having a first end section located in said container and close to a bottom of said container of said vapor-liquid contacting device, and a second end section connected to said vapor adsorbent canister; and a pump disposed in said purge line, said pump being operated to purge the vapor from said vapor adsorbent and feed the purged vapor into said container of said vapor-liquid contacting device so that the vapor is absorbed in the volatile liquid in said container of said vapor-liquid contacting device.

7. A vapor treatment system as claimed in claim 6, further comprising:

a sub-line having first and second end sections which are connected respectively to upstream and downstream portions of said purge line, said upstream and downstream portions being located respectively on upstream and downstream sides of said pump with respect to flow of the vapor of the volatile liquid upon operation of said pump;

a first valve disposed in said purge line and located downstream of said downstream portion in said purge line with respect to flow of the vapor of the volatile liquid upon operation of said pump;

a second valve disposed in said sub-line;

a compressor disposed in said sub-line and located in series with said second valve; and a sub-tank connected to a portion of said sub-line between aid second valve and said compressor so as to temporarily store gas staying in said vapor treatment system.

8. A vapor treatment system as claimed in claim 6, further comprising a cooling device disposed in said return line to cool the volatile liquid passing through the return line to be fed into said container of said vapor-liquid contacting device.

9. A vapor treatment system as claimed in claim 6, further comprising a heating device disposed around said vapor adsorbent canister to heat said vapor adsorbent when the vapor is purged from said vapor adsorbent.

10. A vapor treatment system incorporated with a storage tank for a volatile liquid, comprising:

a vapor adsorbent canister containing therein vapor adsorbent;

a first ventilation line having a first end section connected to an upper space inside the storage tank, and a second end section connected to said vapor adsorbent canister;

a vapor control valve disposed in said first ventilation line to control flow of vapor of the volatile liquid passing through said first ventilation line;

a second ventilation line having a first end section connected to a liquid supply pipe through which the volatile liquid is supplied into the storage tank, and a second end section connected to said vapor adsorbent canister;

a purge line having a first end section inserted into the storage tank, and a second end section connected to said vapor adsorbent canister;

a cooling device for cooling and liquefying the vapor of the volatile liquid, said cooling device being disposed in said purge line; and a pump disposed in said purge line upstream of said cooling device with respect to flow of the vapor upon operation of said pump, said pump being operated to purge the vapor from said vapor adsorbent and to cause the purged vapor to pass through said cooling device so that the purged vapor is cooled and liquefied to be returned to the storage tank.

11. A vapor treatment system as claimed in claim 10, further comprising:

a sub-line having first and second end sections which are connected respectively to upstream and downstream portions of said purge line, said upstream and downstream portions being located respectively on upstream and downstream sides of said pump with respect to flow of the vapor of the volatile liquid upon operation of said pump;

a first valve disposed in said purge line and located downstream of said downstream portion in said purge line with respect to flow of the vapor of the volatile liquid upon operation of said pump;

a second valve disposed in said sub-line;

a compressor disposed in said sub-line and located in series with said second valve; and a sub-tank connected to a portion of said sub-line between said second valve and said compressor so as to temporarily store gas staying in said vapor treatment system.

12. A vapor treatment system as claimed in claim 10, further comprising a heating device disposed around said vapor adsorbent canister to heat said vapor adsorbent when the vapor is purged from said vapor adsorbent.

13. A gasoline vapor treatment system incorporated with a gasoline tank of an automotive vehicle, comprising:

a vapor adsorbent canister containing therein vapor adsorbent for gasoline vapor;

a first ventilation line having a first end section connected to an upper space inside the storage tank, and a second end section connected to said vapor adsorbent canister;

a vapor control valve disposed in said first ventilation line to control flow of vapor of the gasoline passing through said first ventilation line;

a second ventilation line having a first end section connected to a liquid supply pipe through which the gasoline is supplied into the storage tank, and a second end section connected to said vapor adsorbent canister;

a purge line having a first end section inserted into the storage tank, and a second end section connected to said vapor adsorbent canister;

a device for liquefying the vapor of the gasoline, said liquefying device being disposed in said purge; and a pump disposed in said purge line upstream of said liquefying device with respect to flow of the vapor upon operation of said pump, said pump being operated to purge the vapor from said vapor adsorbent and to cause the purged vapor to pass through said liquefying device so that the purged vapor is liquefied.

* * * * *